March 30, 1937.  J. MIERS  2,075,535
MOTOR VEHICLE CONTROL
Filed Feb. 10, 1936
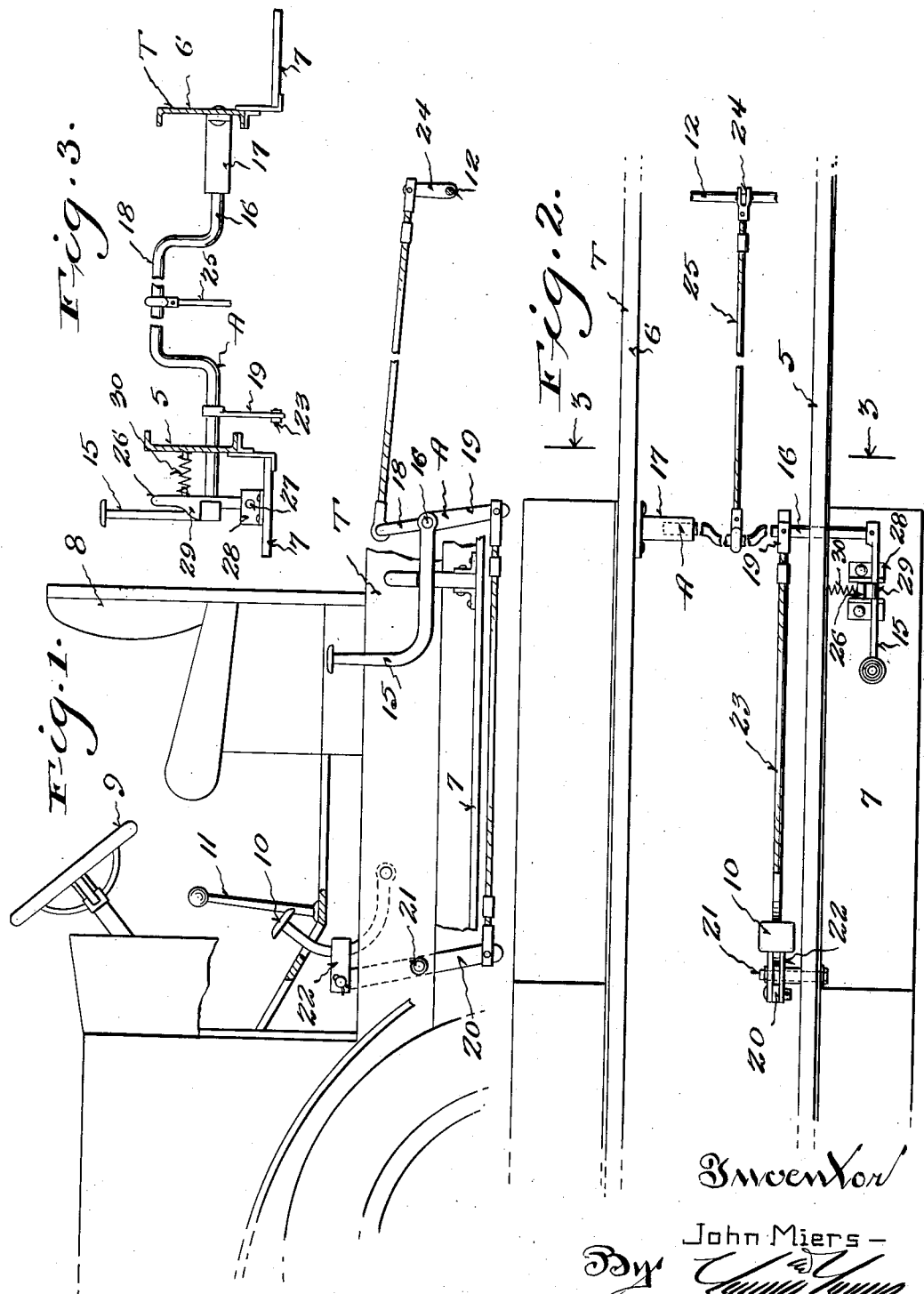
Inventor
John Miers
By Young & Young
Attorneys Patented Mar. 30, 1937

2,075,535

UNITED STATES PATENT OFFICE 2,075,535

MOTOR VEHICLE CONTROL

John Miers, Oostburg, Wis.

Application February 10, 1936, Serial No. 63,285

1 Claim. (Cl. 192—13)

This invention appertains to motor vehicles, and more particularly to novel means for controlling the operation of the vehicle from the running-board thereof.

Considerable difficulty is experienced in backing trucks in confined spaces, particularly where the rear view is obstructed or partially obstructed by the load, cab walls, etc.

It is, therefore, one of the primary objects of my invention to provide means whereby the driver can stand on the running-board of the truck to obtain a clear vision and effectively control the stopping and backing of the truck.

Another salient object of my invention is the provision of a control means for trucks which can be readily applied to a standard truck without any change in the construction thereof.

A further object of my invention is the provision of a foot pedal disposed on the side or running-board of the truck adjacent to the driver's seat, having means operatively connecting the same to the vehicle clutch pedal and the vehicle brakes, whereby the clutch and the brakes can be simultaneously and quickly controlled by a person standing on the running-board of the truck.

A further salient object of my invention is the provision of a releasable latch for holding the pedal in its depressed position with the clutch thrown out and the brakes applied, the latch being quickly operable by the foot of the operator, so that movement of the truck can be had when desired.

A still further object of my invention is to provide a clutch and brake control for trucks of the above character, which will be durable and efficient in use, one that will be simple and easy to manufacture, and one which can be placed upon the market and incorporated with a conventional truck at a low cost.

With these and other objects in view, the invention consists in the novel construction, arrangement, and formation of parts, as will be hereinafter more specifically described, claimed, and illustrated in the accompanying drawing, in which drawing:

Figure 1 is a fragmentary side elevation of a truck with my improved control mechanism applied thereto, parts of the view being shown in section.

Figure 2 is a fragmentary top plan view illustrating my mechanism applied to a truck.

Figure 3 is a transverse view through the truck frame taken substantially on the line 3—3 of Figure 2, looking in the direction of the arrows.

Referring to the drawing in detail, wherein similar reference characters designate corresponding parts throughout the several views, the letter T indicates a motor truck, and A my improved control appliance therefor.

As heretofore inferred, the truck T can be of any desired make and includes the usual chassis having the longitudinally extending side beams 5 and 6 supporting the running-boards or steps 7. Any desired type of driver's seat 8 is provided, and the vehicle embodies the usual steering wheel 9, swinging clutch pedal 10, and transmission shift lever 11.

My improved control appliance A comprises a control foot pedal 15, which is located above a running-board 7 on one side of the car and preferably adjacent to the driver's seat or cab. This foot pedal or lever 15 is rigidly connected to one end of a rock shaft 16, which is mounted in suitable bearings 17 carried by the side channel beams 5 and 6 of the chassis. This rock shaft 16 is provided with a U-shaped throw or crank portion 18, for a purpose which will be later set forth. A crank-arm 19 is also rigidly secured to the rock shaft.

The chassis has rockably connected thereto, adjacent to the clutch pedal 10, a double-armed lever 20. The lever 20 is rockably mounted intermediate its ends upon a pivot pin or stub shaft 21 rigidly connected to the channel beam 5, and the upper end of the lever is connected by means of a strap 22 to the clutch pedal 10. The lower end of the lever 20 is operatively connected to the crank-arm 19 by means of a cable or connecting link 23.

From the description so far, it can be seen that when the foot pedal 15 is depressed, the clutch pedal 10 will be depressed therewith for disengaging the clutch.

Means has also been provided for applying the brakes of the vehicle simultaneously with the disengagement of the clutch, and only sufficient parts of the brake mechanism have been illustrated to show the operation of my invention.

Extending transversely across the truck frame in rear of the rock shaft 16, is the usual brake shaft 12 forming a part of the emergency brake construction, and this shaft is operatively connected to the wheel brakes (not shown) and to the emergency brake lever (not shown).

In accordance with my invention, I secure to the rockable brake shaft 12 a crank-arm or lever 24, and this lever is operatively connected to the U-shaped crank portion 18 of the rock shaft 16 by means of a cable or link 25. Thus, upon downward movement of the pedal 15 the rock shaft 16 will be partially rotated in a counterclockwise direction (referring to Figure 1), which will rock the shaft 12 to apply the brakes and depress the clutch pedal 10, as heretofore stated.

In Figures 1, 2, and 3, the pedal 15 is shown in its depressed position, and consequently the clutch is thrown out and the brakes are applied. When the pedal 15 is in its depressed position, I provide a releasable latch for holding the same against accidental raising movement.

This means consists of a latch lever 26 rockably mounted at its lower end on a pivot pin 27 carried by a bracket 28 rigidly secured to the running-board 7 adjacent to the foot pedal 15. The latch lever 26 has formed thereon a detent or nose 29 for engaging over the top of the pedal 15, and the upper edge of the detent or nose is of a cam shape, so that as the foot pedal 15 is depressed, the latch lever will be swung aside so that the foot pedal will engage under said detent or nose. An expansion spring 30 is provided for normally urging the latch lever toward the pedal 15 and the nose 29 in the path of movement of said lever. Obviously, when it is desired to release the pedal 15, it is merely necessary for the driver to push the latch lever 26 inwardly toward the channel beam 5 against the tension of the spring 30, until the nose 29 rides past the pedal 15. This will allow the pedal 15 to automatically return to its normal raised position under action of the springs (not shown) for normally holding the clutch pedal 10 in a raised position.

When the driver desires to back his vehicle, it is merely necessary for him to stand on the running-board 7 and depress the foot pedal 15, so as to disengage the clutch pedal 10 and apply the brakes. The shift lever 11 can now be moved so as to throw the truck in reverse, after which the foot pedal 15 can be released, so that the clutch can be thrown in and the brakes released to permit backing movement of the truck. The driver, while standing on the running-board, can easily manipulate the steering wheel 9.

After the truck has backed the desired distance, it is merely necessary for the driver to again depress the foot pedal 15. When the driver desires to start forwardly, the shift lever can be moved into its neutral position, and the foot pedal 15 can be released, and the truck can be controlled from the cab in the ordinary manner. It is also to be noted that the truck can be run forwardly from the running-boards, and in this instance it is merely necessary to move the shift lever 11 into a forward speed position.

The spring on the clutch pedal 10 and on the brakes is normally sufficient to return these parts and the foot pedal 15 to their normal positions, but, if preferred, spring means can be associated with the foot pedal 15 for holding the same in a raised position.

From the foregoing description it can be seen that I have provided an exceptionally simple and durable appliance for controlling the operation of a vehicle from the running-boards thereof.

Changes in details may be made without departing from the spirit or the scope of my invention, but what I claim as new is:

The combination with a motor vehicle including side channel beams, a running-board, a clutch pedal, a transmission shift lever and a brake rock shaft, of means for controlling the operation of the truck from the running-board including a crank shaft rockably mounted on the channel beams, a foot pedal rigidly secured to the rock shaft adjacent to the running-board, a double-armed lever rockably mounted intermediate its ends on the vehicle adjacent to the clutch pedal, means operatively connecting the upper end of the lever to the clutch pedal, a crank-arm on the crank shaft, means operatively connecting the crank-arm to the lower end of the lever, means operatively connecting the throw of the crank shaft to the brake rock shaft, and releasable means for normally holding the foot pedal in a depressed position, said releasable means including a latch lever disposed at right angles to the foot pedal rockably mounted on the running-board having a cam-shaped nose on its upper free end, and spring means normally urging the nose in the path of movement of the foot pedal.

JOHN MIERS.